United States Patent
Velo et al.

(10) Patent No.: US 6,393,973 B1
(45) Date of Patent: May 28, 2002

(54) COOKING UTENSIL WITH REMOVABLE GRIP HANDLE

(75) Inventors: Lionel Velo, Rumilly; Michel Montgelard, Cran Gevrier, both of (FR)

(73) Assignee: SEB SA (FR)

( * ) Notice: Subject to any disclaimer, the term of this patent is extended or adjusted under 35 U.S.C. 154(b) by 0 days.

(21) Appl. No.: 09/889,265

(22) PCT Filed: Jan. 18, 2000

(86) PCT No.: PCT/FR00/00097
§ 371 (c)(1),
(2), (4) Date: Aug. 27, 2001

(87) PCT Pub. No.: WO00/44269
PCT Pub. Date: Aug. 3, 2000

(30) Foreign Application Priority Data

Jan. 28, 1999 (FR) .............................................. 99 00962

(51) Int. Cl.[7] .......................... A47J 27/00; A47J 45/06; A47J 45/07; A47J 45/10; B65D 25/28

(52) U.S. Cl. .............................. 99/422; 99/340; 99/403; 99/449; 16/111.1; 16/422; 16/425; 220/759; 220/770

(58) Field of Search ........................ 99/337, 338, 340, 99/403, 410, 422–425, 449, 646 R; 16/110.1, 111.1, 422, 425, 434, 444, DIG. 41; 126/390.1, 373.1, 369; 220/759, 770, 573.1, 753, 769, 752, 755, 912; 294/30, 57, 58, 25, 19.1, 1.1; D7/357, 361, 395

(56) References Cited

U.S. PATENT DOCUMENTS

| | | | | |
|---|---|---|---|---|
| 2,712,151 A | | 7/1955 | Becht | |
| 4,014,129 A | * | 3/1977 | Capra | 99/422 X |
| 4,171,144 A | * | 10/1979 | Rodriquez | 294/30 |
| 4,574,777 A | * | 3/1986 | Bohl et al. | 99/425 X |
| 4,653,468 A | * | 3/1987 | Lemme et al. | 126/373 |
| 4,711,366 A | * | 12/1987 | Chen | 99/337 |
| 4,822,087 A | * | 4/1989 | DeCarlo | 294/58 |
| 4,926,521 A | * | 5/1990 | Gagnepain | 16/430 X |
| 5,125,130 A | * | 6/1992 | Stanish | 16/430 |
| 5,313,735 A | * | 5/1994 | Latouche | 99/449 X |
| 5,365,832 A | * | 11/1994 | Gaydoul | 99/422 |
| 5,373,608 A | * | 12/1994 | Welch | 99/403 X |
| 5,673,458 A | * | 10/1997 | Roult | 16/425 |
| 5,715,570 A | * | 2/1998 | Hyun | 16/110.1 |
| 5,887,751 A | | 3/1999 | Kroscher | |

FOREIGN PATENT DOCUMENTS

| | | |
|---|---|---|
| EP | 852924 | 7/1998 |
| FR | 1330214 | 12/1963 |
| FR | 2734466 | 11/1996 |
| GB | 1457467 | 12/1976 |

* cited by examiner

Primary Examiner—Timothy F. Simone
(74) Attorney, Agent, or Firm—Bachman & LaPointe, P.C.

(57) ABSTRACT

The invention concerns a cooking utensil comprising a bowl and a removable grip handle. The bowl comprises over at least part of its periphery a rim projecting outwards from the bowl side wall, at least an orifice for receiving the handle passing through the rim wall, while the handle end comprises an upper part limited by a stop and designed to be inserted from above the orifice up to the stop and a lower part designed to extend beneath the rim. The invention is particularly applicable to cake tins.

15 Claims, 4 Drawing Sheets

COOKING UTENSIL WITH REMOVABLE GRIP HANDLE

BACKGROUND OF THE INVENTION

The present invention relates to a cooking utensil comprising a receptacle and a removable handle.

Such utensils are generally pans or frying pans and the removable handle makes it possible for them to be stored and put into a dishwasher while taking up less room.

Such utensils have a housing on their side wall or on a peripheral rim of the side wall for the purpose of receiving one end of the removable handle. A spring system in this end of the handle makes it possible to secure the handle in reliable manner to the receptacle, and it is necessary to apply voluntary pressure on a portion of the system in order to be able to release the handle.

For safety reasons that type of removable handle is relatively sophisticated and thus comprises a plurality of elements made of a variety of materials, metals and plastics, which elements need to be assembled together, and that means that the product is quite heavy and its cost of manufacture is not negligible. Providing a suitable housing on the receptacle requires successive stamping and welding operations.

Being heavy and relatively expensive, that type of handle is therefore adapted to receptacles that are themselves relatively heavy and of superior quality, for example stainless steel pans.

Such a handle is not suitable for lightweight receptacles of low cost, such as aluminum pans, even though the advantage of compactness remains regardless of the quality and the material of the receptacle.

It is probably for this reason that cake or pie molds or tins which are often made of aluminum or light metal alloy have never benefited from having a handle, even though they would appear to be just as suitable for receiving removable handles as are pans. Such molds are therefore still being removed from ovens using an oven cloth or gloves to provide a degree of thermal insulation, but often unhygienically because they come directly into contact with the cake or the pie.

SUMMARY OF THE INVENTION

Given this state of the art, the invention proposes making a handle device suitable for various types of cooking receptacle, not exclusively lightweight receptacles, the handle device being simple, low cost, and reliable. The invention also proposes providing a receptacle suitable for receiving said handle.

The invention thus provides a cooking utensil comprising a receptacle and a removable handle adapted to penetrate via one end into a housing in the receptacle.

The utensil is characterized in that over at least a fraction of its perimeter the receptacle has a rim that projects outwards from the side wall of the receptacle with at least one handle-receiving orifice passing through the wall of said rim, and in that said end of the handle includes a top end portion defined by an abutment and adapted to be inserted downwards into said orifice until the abutment is reached, and a bottom end portion adapted to extend under said rim.

As a result, the top end portion of the handle supports the portion of the receptacle rim that is situated between the vertical wall of the receptacle and the edge of the orifice closest to said vertical wall. The edge of the receptacle is thus located between the top and bottom end portions of the handle.

In addition, said abutment is constituted by a setback between said top end portion of the handle and the remainder of the top of the handle, said top end portion extending in a plane that slopes relative to the top of the handle situated behind the abutment, so as to co-operate with the wall of the abutment to form an acute-angled V-groove.

With the rim of the receptacle lying essentially on said top end portion, said configuration makes it possible for the receptacle to be held by means of the handle in a plane that is slightly inclined as is the plane of said top end portion of the handle relative to the substantially horizontal plane of the remainder of the top end portion of the handle, so that the receptacle is held by its own weight against the abutment via the innermost edge of the reception orifice.

In a preferred embodiment, said bottom end portion of the handle extends beyond said abutment of the top end portion over a distance that is substantially equal to the distance between the inside edge of the rim to the nearest or innermost edge of the reception orifice.

A receptacle held by the handle is thus pressed via its vertical wall against the bottom end portion of the handle, which portion preferably presents an edge with concave curvature adjacent to the vertical wall of the receptacle and particularly adapted to round receptacles such as cake or pie molds or tins, but is also suitable for straight-walled receptacles such as deep cake tins. An edge with a concave curve will nevertheless provide at least two spaced-apart bearing points on the receptacle whether its vertical wall is straight or curved, thus achieving greater stability.

Thus, a cooking utensil is provided that includes a handle which can quickly be engaged with or disengaged from the receptacle without requiring a dynamic system including springs, etc.

The handle is thus advantageously made as a one-piece molding of a plastics material that withstands high temperatures, such as a polyamide.

BRIEF DESCRIPTION OF THE DRAWINGS

Other features and advantages appear from the following description of the embodiment described in non-limiting manner.

In the accompanying drawings.

DETAILED DESCRIPTION OF THE PREFERRED EMBODIMENT(S)

Figure 1A:
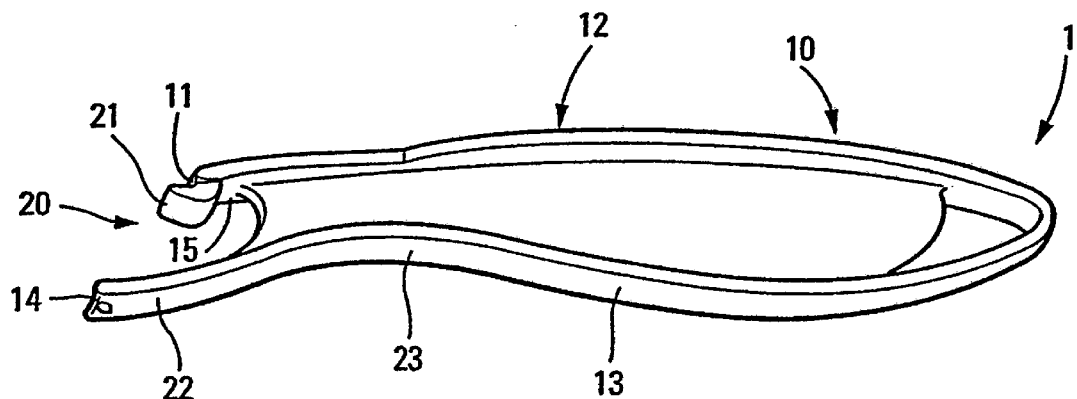
FIGS. 1A, 1B, and 1C are respectively a profile view, a plan view, and a view from beneath of a handle of the invention.
Figure 1B:
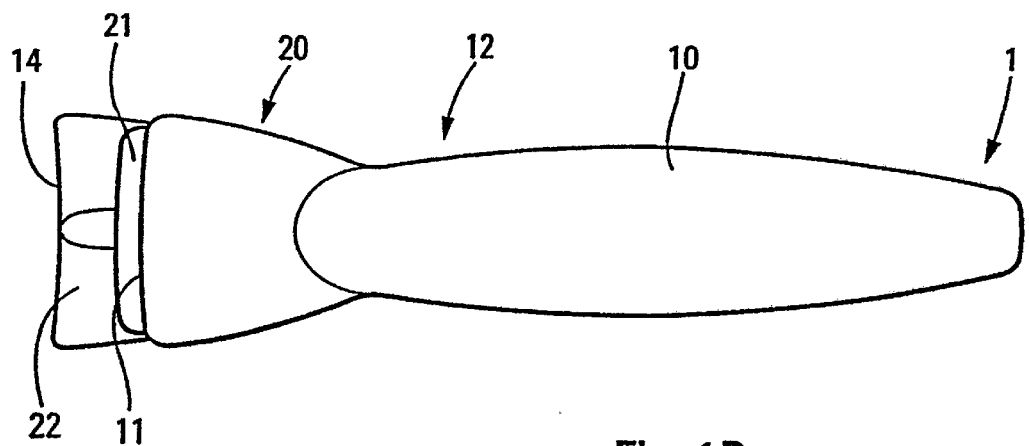
Figure 1C:
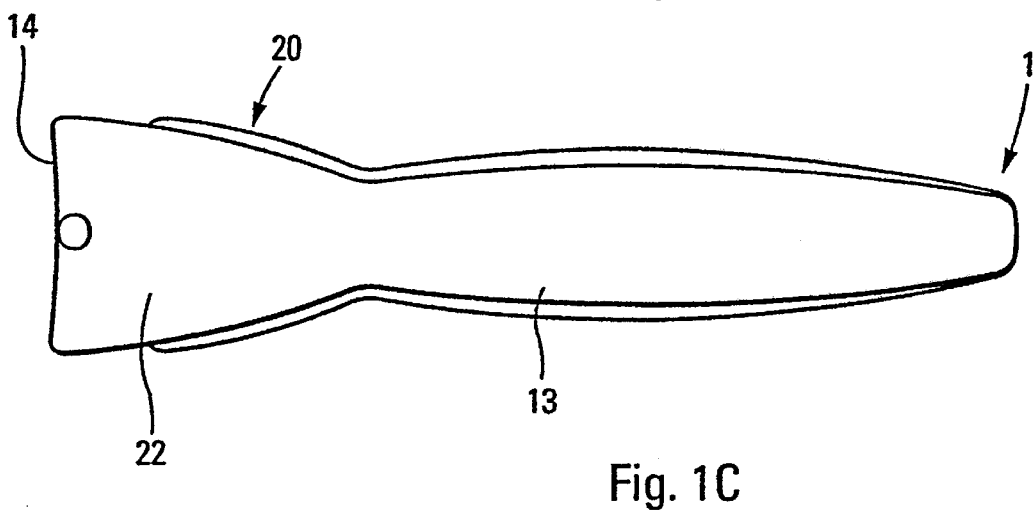

With reference to FIG. 1, the handle 1 is constituted by a one-piece molding of a plastics material such as a fiber-filled polyamide, that is thermally insulating, that presents good mechanical strength, and that withstands high temperatures sufficiently to be able to come into contact with a metal dish on leaving the oven.

On handle 1, a grip 10 is connected at its end remote from its free end to a fixing portion 20 of generally trapezoidal shape enabling the handle 1 to be releasably secured to a suitable receptacle 2, 3.

The fixing portion 20 ends in a fork comprising a short top end portion 21 and a long bottom end portion 22.

Figure 4A:
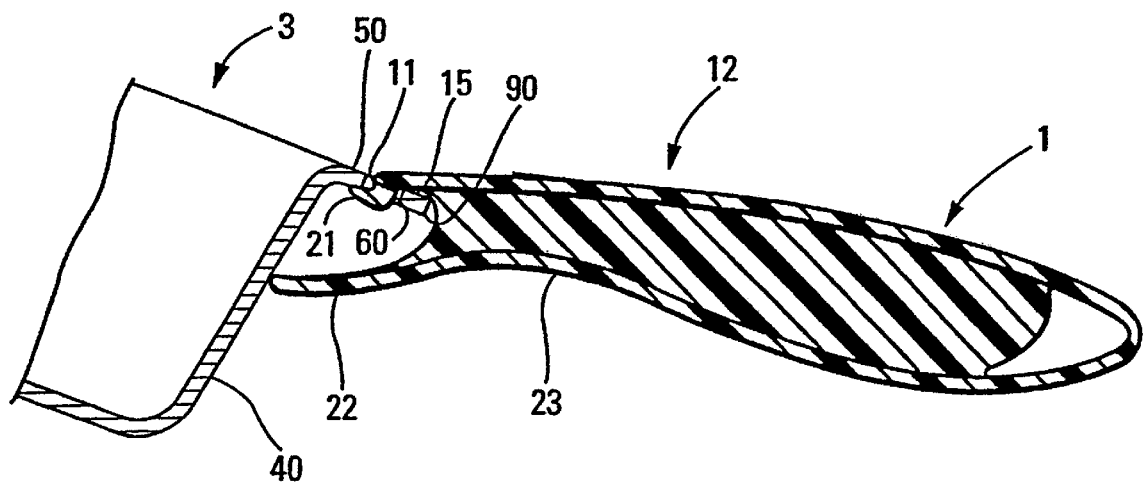
FIGS. 4A and 4B are respectively a longitudinal section view and a plan view of a handle secured to a round or rectangular receptacle, thus showing a cooking utensil of the invention.
Figure 4B:
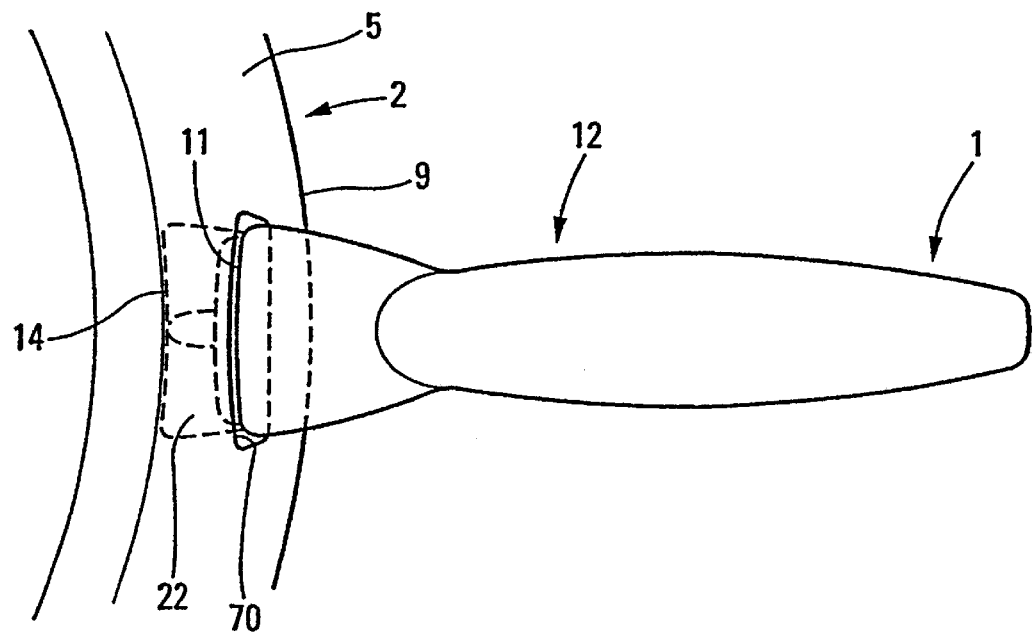

The top end portion 21 is defined by a substantially vertical wall 11 that forms an abutment when the handle is inserted into a receptacle, as can be seen with reference to FIG. 4. This abutment 11 is constituted by a setback between said top end portion 21 and the remainder of the top 12 of the handle.

The top end portion 21 extends in a plane that slopes relative to said top 12 of the handle situated behind the abutment 11, so as to co-operate with the wall of the abutment 11 to form an acute-angled V-groove.

Furthermore, the top end portion 21 is connected via its bottom wall 15 to the main body of the handle 1, leaving an empty space behind the abutment 11, with these dispositions serving purposes that can be seen with reference to FIG. 4.

The bottom end portion 22 extends beyond the top end portion 21 in a plane that intersects the plane of the top 12 of the handle situated behind the abutment 11.

With the handle viewed in longitudinal section, the bottom end portion 22 connects to the remainder to the bottom portion 13 of the handle via a concave curve suitable for receiving an index finger, the bottom portion 13 situated behind that curve, itself presenting convex curvature for greater comfort in the hand.

Figures 2A, 2B:
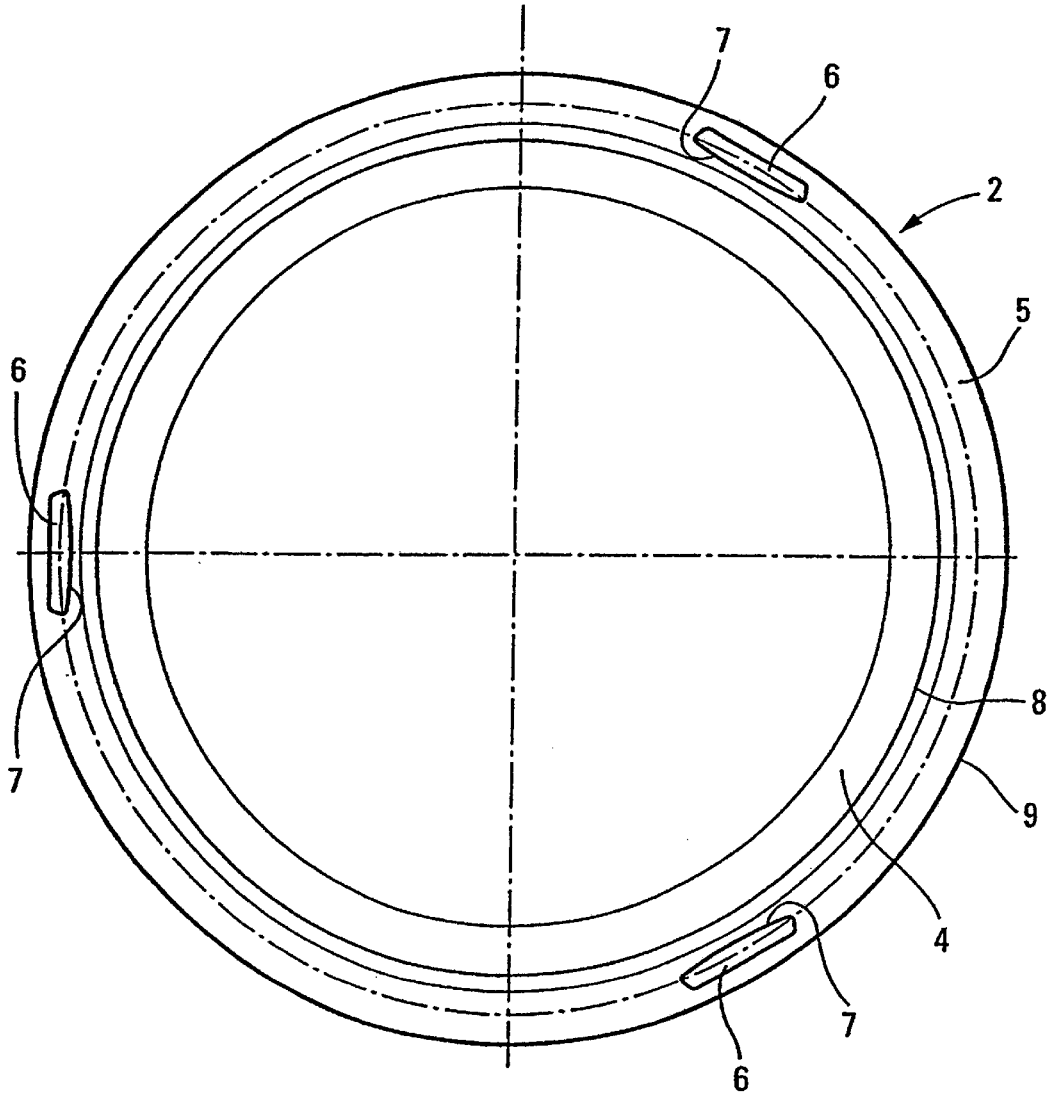
FIGS. 2A and 2B are respectively a section view and a plan view of a round receptacle suitable for receiving a handle.
Figure 3A:
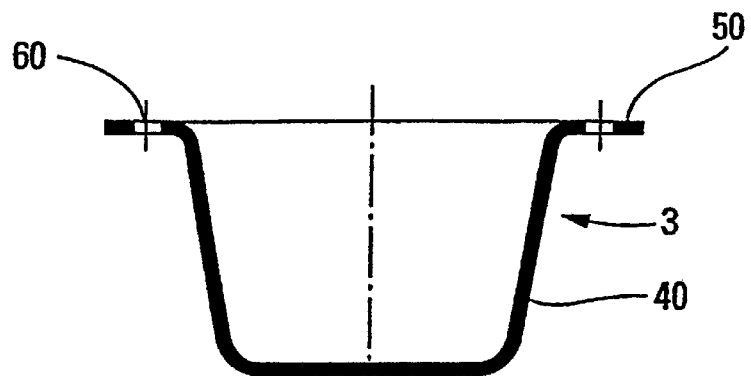
FIGS. 3A and 3B are respectively a section view and a plan view of a rectangular receptacle suitable for receiving a handle.
Figure 3B:
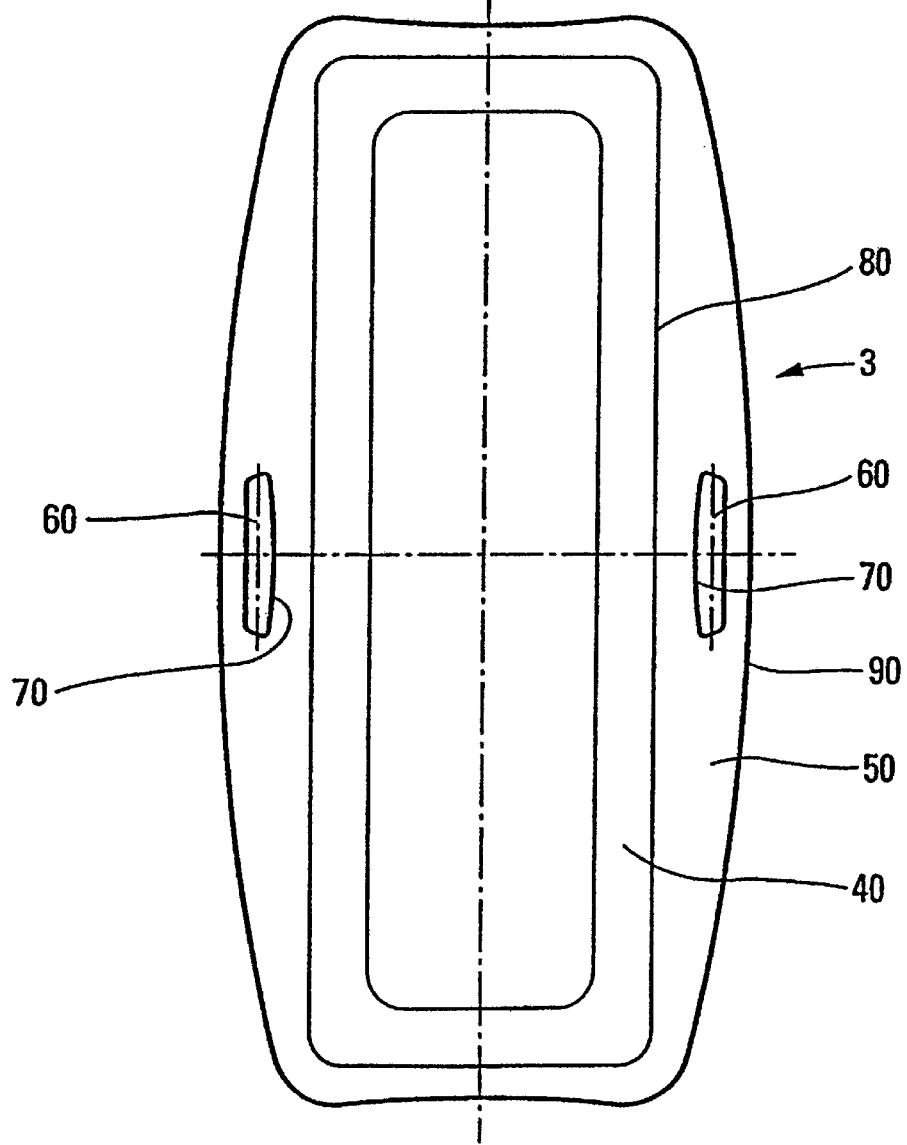

With reference to FIGS. 2 and 3, the receptacle 2 shown is a round mold of the pie tin type made of aluminum or some other light metal alloy, and its vertical wall 4 has an outwardly projecting peripheral rim 5 in which three longitudinal orifices 6 have been cut out to receive the handle 1, which orifices are spaced apart equidistantly.

The receptacle 3 is a rectangular metal mold of the cake tin type presenting, like the pie tin 2, a peripheral rim 50 projecting outwards from the top of its vertical wall 40, and each of the two long sides of the rim presents a longitudinal orifice 60 in its middle for receiving the handle 1.

With reference to FIG. 4, in order to take hold of the mold 2, 3 with the handle 1, the handle is tilted towards the mold so that the top end portion 21 thereof can be inserted downwards into an orifice 6, 60. The acute-angled V-groove connecting said portion 21 to the remainder of the top 12 of the handle serves to hook onto the mold 2, 3 thus enabling it to be lifted immediately, with the innermost edge 7, 70 of the orifice 6, 60 being held against the abutment 11.

Simultaneously, the outside edge 9, 90 of the rim 5, 50 extends into the space formed behind the top end portion 21, with the bottom wall 15 thereof acting as a secondary abutment for the edge 9, 90.

The bottom end portion 22 extends beneath the peripheral rim 5, 50. Advantageously, it extends beyond the abutment 21 over a distance that is substantially equal to the distance between the inside edge 8, 80 of the rim 5, 50 and the nearest edge 7, 70 of the orifice 6, 60 so as to serve as an abutment for the vertical wall 4, 40.

On its side adjacent to the vertical wall 4, 40 of the receptacle 2, 3, the bottom end portion 22 has an edge 13 with concave curvature so as to enable it to fit against round receptacles or so as to provide at least two bearing points on plane vertical walls.

Because the bottom portion 22 extends in a plane that intersects the plane of the top 12 of the handle behind the abutment 11, the user's hand naturally inclines the grip portion 10 of the handle 1 in such a manner that the horizontal plane on which the receptacle 2, 3 comes into alignment is not the plane of the top 12 of the handle, but the plane of the bottom end portion 22, as can be seen in FIG. 4A.

In the same way as the slope of the top end portion 21 encourages the receptacle 2, 3 to be held naturally against the abutment 11, titling the bottom end portion 22 contributes to holding the receptacle against the edge 14.

A cooking utensil is thus provided comprising a receptacle and a removable handle both of which can be made at low cost, the handle being a single molding and the housing for receiving it a simple through orifice.

Naturally, the invention is not limited to the embodiment described above, and numerous variants can be applied thereto without going beyond the ambit of the invention.

Thus, the handle could be of a shape other than a trapezoidal portion running into a longitudinal portion. It will be possible to envisage these two functional portions merging progressively.

What is claimed is:

1. A cooking utensil comprising: a receptacle and a removable handle; said removable handle having one end adapted to penetrate into a housing in the receptacle and a top; at least a fraction of a periphery of the receptacle having an outwardly projecting rim on a side wall of the receptacle with at least one handle-receiving orifice passing through the side wall of said rim; said one end of the handle having a top end portion defined by an abutment to be inserted downwards into said at least one orifice as far as said abutment; said abutment being constituted by a setback between said top end portion and a remainder of the top of the handle; the one end of the handle including a bottom end portion which extends beneath said rim; and the removable handle comprising a springless, nondynamic system.

2. A cooking utensil in accordance with claim 1, further comprising the top end portion extending in a plane that slopes relative to a portion of the top of said handle situated behind the abutment so as to co-operate with a wall of the abutment to form an acute-angled V-groove.

3. A cooking utensil in accordance with claim 1, further comprising said top end portion having a bottom wall and said top end portion being connected via said bottom wall to a main body of the handle so as to leave an empty space behind the abutment for receiving an outside edge of the rim of the receptacle.

4. A cooking utensil in accordance with claim 1, further comprising said bottom end portion extending beyond said abutment of the top end portion over a distance that is substantially equal to the distance of a bottom edge of the rim from a nearest edge of the at least one orifice.

5. A cooking utensil in accordance with claim 1, wherein a side of the bottom end portion adjacent to a vertical wall of the receptacle presents an edge of concave curvature.

6. A cooking utensil in accordance with claim 1, wherein said bottom end portion extends in a plane that intersects a plane containing the top of the handle situated behind the abutment.

7. A cooking utensil in accordance with claim 1, wherein said bottom end portion connects with a remainder of a bottom portion of the handle via a concave curved wall suitable for receiving an index finger.

8. A cooking utensil in accordance with claim 7, wherein the handle has a bottom wall with convex curvature behind said concave curve.

9. A cooking utensil in accordance with claim 1, wherein said handle is a single piece.

10. A cooking utensil in accordance with claim 1, wherein said handle is molded out of a plastic material that withstands heat.

11. A cooking utensil in accordance with claim 10, wherein said plastic material is a polyamide.

12. A cooking utensil in accordance with claim 1, wherein said receptacle is made of aluminum.

13. A cooking utensil in accordance with claim 1, wherein said receptacle is made of a light metal alloy.

14. A cooking utensil in accordance with claim 1, wherein said receptacle is a round metal mold presenting a peripheral rim having three longitudinal orifices for receiving the handle therein distributed in an equidistant manner.

15. A cooking utensil in accordance with claim 1, wherein said receptacle is a rectangular metal mold presenting a peripheral rim in which each of two long sides has a length and a longitudinal orifice for receiving the handle at a middle of said length.

* * * * *